United States Patent
Thomson

(10) Patent No.: US 7,558,739 B2
(45) Date of Patent: Jul. 7, 2009

(54) METHOD AND APPARATUS FOR MEETING AN ON-SITE ENTERPRISE SERVICE LEVEL OBJECTIVE

(75) Inventor: Rodney A. Thomson, Westminster, CO (US)

(73) Assignee: Avaya Inc., Basking Ridge, NJ (US)

( * ) Notice: Subject to any disclaimer, the term of this patent is extended or adjusted under 35 U.S.C. 154(b) by 1354 days.

(21) Appl. No.: 10/278,445

(22) Filed: Oct. 22, 2002

(65) Prior Publication Data

US 2004/0203878 A1 Oct. 14, 2004

(51) Int. Cl.
*G06F 9/46* (2006.01)
*H04M 3/42* (2006.01)
*H04W 24/00* (2006.01)

(52) U.S. Cl. .............................. 705/8; 705/9; 455/414.1; 455/456.3

(58) Field of Classification Search ............... 455/414.1, 455/456.1, 419, 456; 705/5, 9, 15, 16, 26, 705/8

See application file for complete search history.

(56) References Cited

U.S. PATENT DOCUMENTS

| 5,206,903 | A | | 4/1993 | Kohler et al. ............... 379/309 |
|---|---|---|---|---|
| 5,828,747 | A | | 10/1998 | Fisher et al. ................ 379/309 |
| 5,905,793 | A | | 5/1999 | Flockhart et al. ............ 379/266 |
| 5,982,873 | A | | 11/1999 | Flockhart et al. ............ 379/266 |
| 6,023,681 | A | * | 2/2000 | Whitt ............................. 705/8 |
| 6,026,375 | A | * | 2/2000 | Hall et al. ...................... 705/26 |
| 6,088,441 | A | | 7/2000 | Flockhart et al. ............ 379/265 |
| 6,163,607 | A | | 12/2000 | Bogart et al. ................ 379/266 |
| 6,173,053 | B1 | | 1/2001 | Bogart et al. ................ 379/266 |
| 6,192,122 | B1 | | 2/2001 | Flockhart et al. ............ 379/266 |
| 6,497,362 | B2 | * | 12/2002 | Persky et al. ................ 235/383 |
| 6,535,600 | B1 | | 3/2003 | Fisher et al. ........... 379/265.12 |
| 6,681,109 | B1 | * | 1/2004 | Leifer ...................... 455/414.1 |
| 6,813,608 | B1 | * | 11/2004 | Baranowski ................... 705/6 |
| 6,845,361 | B1 | * | 1/2005 | Dowling ........................ 705/5 |
| 2003/0014297 | A1 | * | 1/2003 | Kaufman et al. ............... 705/9 |
| 2004/0203633 | A1 | * | 10/2004 | Knauerhase et al. ...... 455/414.1 |

* cited by examiner

*Primary Examiner*—George Eng
*Assistant Examiner*—Un C Cho
(74) *Attorney, Agent, or Firm*—Sheridan Ross P.C.

(57) ABSTRACT

The present invention is related to the maintenance of on-site enterprise service level objectives. In particular, wait times experienced by individual consumers are monitored. Wait time monitoring may be in response to a request for assistance made by a consumer. The monitoring of wait times may also begin when the consumer enters a particular area of an enterprise site, for example a checkout area. Request for assistance and location information may be obtained from a consumer wireless device in communication with a wireless network infrastructure at the enterprise site. Requests for assistance, including check-out assistance, may be placed in queues maintained by applications on an enterprise server for distributing resources at the enterprise site.

23 Claims, 3 Drawing Sheets

METHOD AND APPARATUS FOR MEETING AN ON-SITE ENTERPRISE SERVICE LEVEL OBJECTIVE

FIELD OF THE INVENTION

The present invention relates to on-site enterprise service levels. In particular, the present invention relates to the maintenance of desired on-site enterprise service levels.

BACKGROUND OF THE INVENTION

At present, enterprises do not have an automated mechanism or systematic means for monitoring service level objectives for consumers that are on-site at an enterprise. For example, people at a retail store may wait in lines for long periods of time, because not enough registers are open. Similarly, consumers may wait for an indefinite amount of time after requesting assistance at a retail location. In particular, enterprises do not have a way to track wait times experienced by consumers at an enterprise site. If consumers must wait long periods of time before receiving assistance or before being able to check out, an enterprise is at risk of losing sales and of losing future business from the consumer. In addition, long wait times can result in consumers relating the experience of long wait times at an enterprise to other consumers, thereby potentially causing the loss of sales that might otherwise have been made to other consumers.

Enterprise sites typically employ manual surveillance of consumers to ensure that consumer wait times are not excessive. However, such surveillance is difficult to perform, because it is hard for a small number of managers to monitor the service provided to all of the consumers at an enterprise site. The difficulty of performing manual surveillance is increased during high volume periods, when the monitoring of checkout lines and of the amount of time required for consumers to obtain assistance is the most critical to customer satisfaction. In manual surveillance systems, the manager or managers must additionally track the enterprise associates on duty, and redeploy associates in response to changing requirements. Typically, associates are redeployed using voice commands issued by the manager. Such voice commands may be delivered by the manager to individual associates directly, or may be broadcast, for example using loudspeaker paging systems.

Conventional systems for ensuring the maintenance of service level objectives at enterprise sites also do not consider whether resources are allocated to individual consumers in a manner that is fair. For instance, the consumers that are most aggressive in pursuing assistance typically receive that assistance sooner than consumers who are less aggressive. In addition, consumers who are more aggressive in switching to a newly opened cash register, or who are fortunate in their selection of cash register lines, may experience shorter wait times than other consumers.

SUMMARY OF THE INVENTION

The present invention is directed to solving these and other problems and disadvantages of the prior art. According to the present invention, a consumer visiting an enterprise site, such as a retail store, is associated with a wireless device. A wireless network infrastructure at the enterprise site then monitors the wireless device to detect requests for assistance, and to determine whether the consumer is waiting at a cash register. Wait times for the consumer to receive assistance after a request for assistance, or for the consumer to pass through the cash register line, can then be monitored to ensure that service level objectives are met.

The wireless device associated with the consumer can be a device that is brought onto the site, or a device that is issued to the consumer upon entering the site. Examples of suitable wireless devices include personal digital assistants (PDAs) capable of communicating with the wireless network, wireless telephones, handheld computers, and wireless headsets. A request for assistance by the consumer may be communicated to the enterprise through the wireless device. This allows the enterprise to track the amount of time that has elapsed since the request was made, and provides a convenient way for the consumer to make the request. The wireless device may also be used to determine the location of the consumer within the enterprise site. An enterprise associate near the location of the consumer, or having expertise with, for example, items stocked in that area of the enterprise site, can then be dispatched to the consumer.

A consumer waiting in a cash register line or at a checkout location can be detected based on the location of the wireless device within the enterprise. In particular, a consumer wireless device in a checkout area of the enterprise can be considered to be associated with a consumer waiting to check out. The amount of time that the consumer has waited to check out may be used to determine whether additional enterprise resources (i.e. cashiers) must be deployed in order to meet service level objectives. The tracking of wait times experienced by individual consumers may also be used to allow newly deployed resources to be equitably provided to consumers. For example, a consumer who has been waiting the longest to check out may be the first consumer assisted by a newly deployed enterprise associate.

These and other advantages and features of the invention will become more apparent from the following description of an illustrative embodiment of the invention taken together with the drawings.

DETAILED DESCRIPTION

Figure 1:
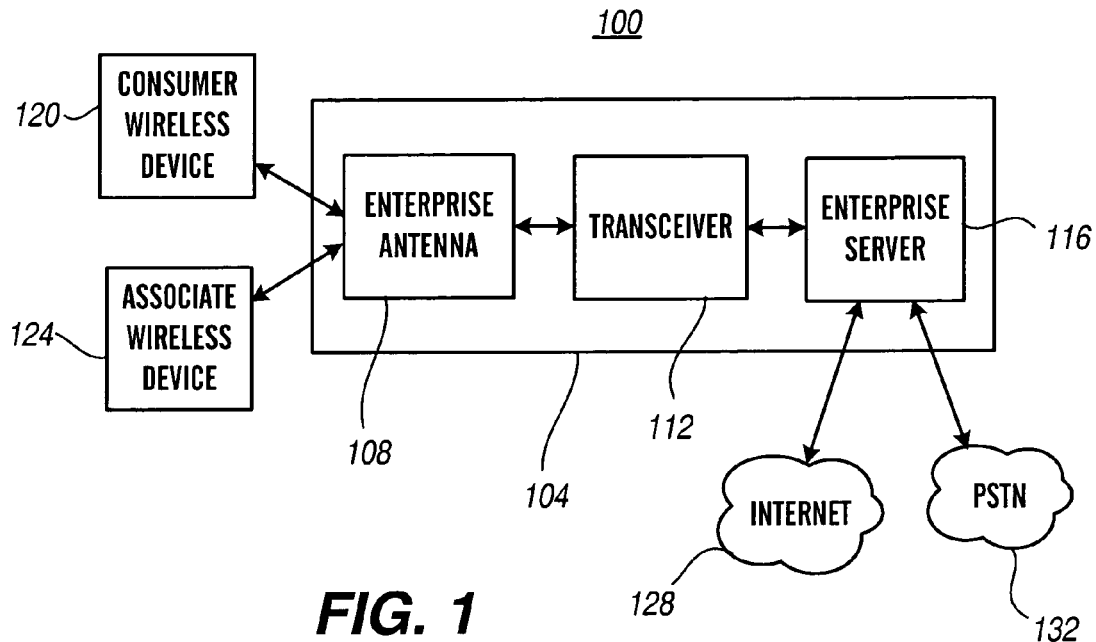
FIG. 1 is a block diagram of an on-site enterprise wireless network in accordance with an embodiment of the present invention.

With reference now to FIG. 1, a wireless on-site enterprise system 100 is shown. In general, the wireless on-site enterprise system 100 comprises an enterprise network infrastructure 104 that generally includes an enterprise antenna 108, a transceiver 112, and an enterprise server 116. The enterprise network infrastructure 104 may be in communication with a consumer wireless device 120. In addition, the enterprise network infrastructure 104 may be in communication with an associate wireless device 124. The enterprise network infrastructure 104 may additionally be interconnected to the Internet 128 and/or to the public switched telephony network (PSTN) 132. The wireless on-site enterprise system 100 may be deployed in connection with any site at which the maintenance of service level objectives is desired. For example, an enterprise system 100 in accordance with an embodiment of the present invention may be deployed at a retail store, a warehouse, a hospital, an airport, a restaurant, a service station, or anywhere else that resources must be deployed in order to provide services to consumers.

The enterprise antenna 108 may comprise a plurality of antennas distributed throughout the enterprise site. In general, the enterprise antenna 108 is any device suitable for establishing a wireless communication link 134 between a consumer wireless device 120 and/or an associate wireless device 124 and the enterprise network infrastructure 104. Accordingly, the enterprise antenna 108 may comprise a radio frequency antenna or an optical frequency emitter and detector (for example in connection with an infrared communication system). The transceiver 112 generally serves to provide signals for transmission by the enterprise antenna 108 based on signals received from the enterprise server 116, for example by modulating a carrier signal. In addition, the transceiver 112 receives signals from the enterprise antenna 108. The transceiver 112 may then, for example, demodulate the received signals and provide the received data signals to the enterprise server 116. The enterprise server 116 may include any general purpose server type computer. Furthermore, the enterprise server 116 may comprise a communication server for operatively interconnecting the enterprise network infrastructure 104 to the Internet 128 and/or the public switched telephony network 132. An example of a suitable communication server is the DEFINITY®/MultiVantage™ server available from the assignee of the present invention. Alternatively or in addition, the enterprise server 116 may comprise a contact center server. An example of a contact center server is the Avaya™ Multimedia Contact Center or Avaya™ MultiVantage™ Call Center available from the assignee of the present invention.

The consumer wireless device 120 may be any portable device that is capable of wireless communication with the enterprise network infrastructure 104. Accordingly, the consumer wireless device 120 may comprise a personal digital assistant (PDA) having wireless communication capabilities, a hand-held computer having wireless communication capabilities, a wireless telephone, or a wireless headset. Similarly, the associate wireless device 124 may comprise any portable device capable of communication with the enterprise network infrastructure 104. Thus, the associate wireless device 124 may also comprise a personal digital assistant, a hand-held computer, a wireless telephone, or a wireless headset. As can be appreciated, the wireless devices 120, 124 may use any suitable wireless network protocol for communicating with the enterprise network infrastructure 104. For example, a BLUETOOTH™, Hyperlan™, IEEE 802.11a, or IEEE 802.11b (WiFi™) wireless network may be utilized.

Figure 2:
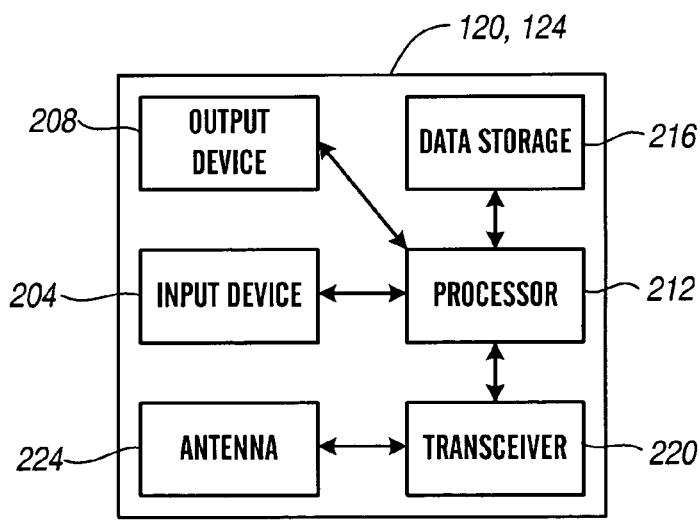
FIG. 2 is a block diagram of a wireless device in accordance with an embodiment of the present invention.

With reference now to FIG. 2, a wireless device 120, 124 in accordance with an embodiment of the present invention is illustrated in block diagram form. In general, the wireless device 120, 124 includes a user input device 204. The user input device 204 allows a user (e.g., a consumer or an associate) to enter data or make selections. Accordingly, the input device 204 may comprise a keyboard, a touch screen, a pointing device, or a microphone. The wireless device 120, 124 additionally includes a user output device 208. The user output device 208 may comprise a visual display, such as a liquid crystal display or a light emitting diode display. Alternatively or in addition, the output device 208 may comprise a speaker for audible output. Furthermore, as can be appreciated, all or certain functions of the input device 204 and output device 208 may be combined, for example in a touch screen for providing visual output and receiving user input.

The wireless device 120, 124 additionally includes a processor 212 for controlling the operation of the device 120, 124. The processor 212 may comprise a general purpose computer processor, such as a PENTIUM™ processor, a digital signal processor, or a controller. The processor 212 may operate in connection with applications stored in data storage 216. In general, the data storage 216 may comprise any device capable of storing computer data. For example, the data storage 216 may comprise solid state memory (e.g., RAM or ROM), a hard disk drive, or an optical storage device. As can be appreciated, where the processor 212 comprises a controller, the data storage 216 may be integrated with the processor 212.

The wireless device 120, 124 additionally includes a transceiver 220 for formatting data for transmission received from the processor 212. The properly formatted data is then provided from the transceiver 220 to a device antenna 224. For example, the transceiver 220 may modulate a carrier signal to transmit data from the wireless device 120, 124 to the enterprise network infrastructure 104. The device antenna 224 additionally serves to receive signals transmitted by, for example, the enterprise antenna 108. The signal received by the device antenna 224 is provided to the transceiver 220, which then formats the received signal and provides the formatted signal to the processor 212. For example, the transceiver may demodulate a signal received by the device antenna 224, and the demodulated signal may be provided to the processor 212.

Figure 3:
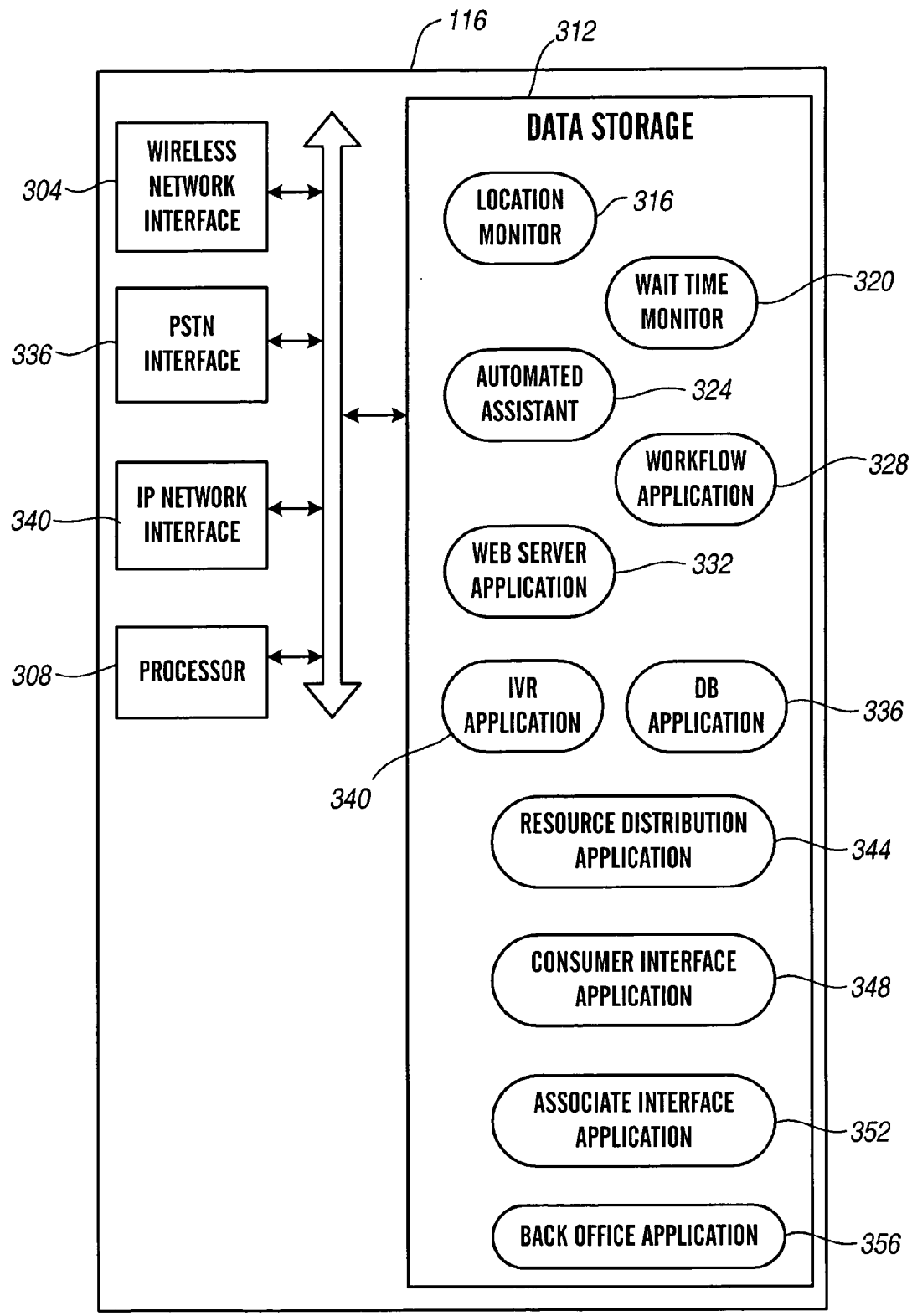
FIG. 3 is a block diagram of enterprise server in accordance with an embodiment of the present invention.

In FIG. 3, a block diagram of an enterprise server 116 in accordance with an embodiment of the present invention is illustrated. In general, the enterprise server 116 comprises a wireless network interface 304, allowing the enterprise server 116 to communicate with and implement the wireless network at the site. In particular, the wireless network interface 304 is in communication with wireless devices 120, 124 through the enterprise antenna 108 and the transceiver 112 (see FIG. 1). Accordingly, the wireless network interface 304 may implement, for example, a BLUETOOTH™, Hyperlan™, IEEE 802.11a or an IEEE 802.11b (WiFi™) wireless network.

The enterprise server 116 additionally includes a processor 308 for controlling the operation of the enterprise server 116. The processor 308 may run various application programs stored in data storage 312. The processor 308 may comprise a general purpose computer processor, such as a PENTIUM™ processor. The data storage 312 may include any computer data storage device. For example, the data storage 312 may comprise solid state memory, a hard disk drive, or an optical storage device.

Applications stored in the data storage 312 capable of running on the processor 308 may include a location monitor 316, a wait time monitor 320, an automated assistant application 324, a workflow application 328, a web server application 332, and a database 336. Separately or as part of another application (e.g. the automated assistant 324), an interactive voice recognition application 340 may be provided. An associate distribution application 344 may be provided for tracking the tasks that have been assigned to associates and to assign new tasks to the associates (e.g., dispatching an associate to a consumer), for example, in connection with a workflow application 328. A consumer interface application 348 and an associate interface application 352 may also be provided. In addition, a back-office application 356 may be provided for inventory monitoring. Not all of the above-listed applications 316-356 need be provided as part of the enterprise server 116. Furthermore, additional applications may be provided as required. In addition, it should be appreciated that the various applications need not be provided as part of a single enterprise server 116. For example, various functions maybe divided between two or more server devices. Furthermore, the functions of various applications may be combined or separated into additional applications.

The location monitor 316 primarily functions to determine and track the location of consumer wireless devices 120 and associate wireless devices 124 in communication with the enterprise network infrastructure 104. In an embodiment of the present invention, the location monitor 316 is capable of locating a consumer wireless device 120 or an associate wireless device 124 within an enterprise site with sufficient resolution to determine a general area of the site at which a consumer or an associate associated with the device 120, 124 is located. According to another embodiment of the present invention, the location monitor 316 functions with sufficient precision to locate the position of a consumer wireless device 120 or an associate wireless device 124 within, for example, a particular aisle. As can be appreciated, the location monitor 316 may operate in connection with signals received from the enterprise antenna or antennas 108 and a map of the site. In yet another embodiment of the present invention, the location monitor 316 simply functions to detect the presence of a consumer wireless device 120 or an associate wireless device 124 at the enterprise site, without providing more detailed location information.

The wait time monitor 320 generally functions to monitor the time that has elapsed since a request for assistance was received from a consumer wireless device 120. The wait time monitor 320 may also function to monitor the amount of time that has elapsed since a consumer wireless device 120 initially entered into communication with the enterprise network infrastructure 104, for example in connection with an enterprise that endeavors to greet each consumer shortly after the consumer arrives at the enterprise site. The wait time monitor 320 may also function to monitor wait times at particular locations within an enterprise site. For instance, the wait time monitor may be used to ensure that consumers are moved through a check out or service area without undue delay.

The automated assistant 324 may provide interactive help to consumers or associates. The automated assistant 324 may function in response to an initial request for assistance, and may operate to provide the required assistance without, for example, connecting a consumer to a live agent through a voice link, or dispatching an associate to the consumer's location. A consumer or an associate may interact with the automated assistant 324 using voice communications, for example in connection with a voice recognition functionality and text to speech functionality, or through a menu-based, graphical format.

The workflow application 328 may control the actions taken by the enterprise in response to various conditions detected with respect to the enterprise site. The resource distribution application 344 may allocate associates between various tasks. In an embodiment of the present invention, the resource distribution application 344 may assign associates between various primary tasks, or between primary tasks and backup tasks. For example, an associate whose primary task involves stocking items may be dispatched to assist a consumer (e.g., a backup task for the associate) who has made a request for assistance when no other associates are available. As a further example, an associate may be dispatched from a previously assigned task to operate a cash register when wait times in the checkout area of the enterprise site are found to be excessive.

The web server application 332 may function to provide information in the form of web pages, for example, to consumers interconnected to the enterprise network infrastructure 104 through the Internet 128. In addition, content may be provided by the web server application 332 to a consumer wireless device 120 or an associate wireless device 124 having a compatible web browser application. The web server application 332 may also function to provide interactive functionality between the enterprise server 116 and the user of a consumer wireless device 120 or an associate wireless device 124.

The database 336 may store data used in connection with the various applications. For example, the database 336 may store profile (i.e. demographic) information regarding consumers who have provided or consented to the use of such information. The database 336 may additionally include information concerning the qualifications of associates working at the enterprise site, the location of items stocked at the enterprise site, and the inventory status of items stocked at the enterprise site and any associated sites.

The interactive voice recognition application 340 may be provided as a stand alone application to service other applications associated with the enterprise network infrastructure 104. Accordingly, the voice recognition application 340 may provide output to, for example, the automated assistant application 324. Alternatively, such functions may be integrated with other applications.

The resource distribution application 344 generally functions to assign associates to tasks. For example, associates that are not engaged in assisting consumers may be assigned to stocking operations. In addition, the resource distribution application 344 may maintain queues used in connection with providing responses to consumer requests. Such queues may be established for various levels and/or types of assistance. For example, a queue may be established for consumers requiring live assistance. Live assistance may be provided by associates located at an off-site contact center who are associated with the enterprise through voice links that may be established between a consumer wireless device 120 and the associate via the enterprise network infrastructure 104 and the public switched telephony network 132 (or a private communication network). Similarly, consumers requiring physical assistance or otherwise requiring in-person assistance, may have their request placed in a queue for such assistance. As can be appreciated, the various queues may be tailored to the consumer's requirements. For example, queues may be established for requests involving particular subject matter or the location of the consumer within the enterprise site. As can further be appreciated, functionality provided as part of a telecommunication or multimedia type contact center may be applied in handling requests for assistance or the initiation of contact with consumers associated with a consumer wireless device 120 present at an enterprise site. An example of a resource or associate distribution application 344 is the Avaya™ Business Advocate application.

In addition, a consumer interface application 348 may be provided to provide an interface between the enterprise server 116 and the consumer wireless device 120. The consumer interface application 348 may additionally control the various other applications associated with the enterprise server 116 and/or the enterprise network infrastructure 104 in providing information to and receiving information from the consumer wireless device 120. Similarly, the associate interface application 352 may provide an interface between associate wireless devices 124 and the enterprise server 116. As can be appreciated, the consumer and associate interface applications 348, 352 may be combined, with functionalities provided to consumer wireless devices 120 being appropriately differentiated from functionalities provided to associate wireless devices 124.

The enterprise server 116 may additionally include a public switched telephony network (PSTN) interface 336. The PSTN interface 336 operates to place the enterprise server 116 in communication with the public switched telephony network 132 (see FIG. 1). Accordingly, the enterprise server 116 may function as a contact center server. Furthermore, through the PSTN interface 336, a wireless device 120, 124 may conduct communications over the public switched telephony network 132.

The enterprise server 116 may also include an Internet protocol (IP) network interface 340. The IP network interface 340 functions to place the enterprise server 116 in communication with the Internet 128 (see FIG. 1). Accordingly, the enterprise server 116 may comprise a web server. In addition, through the IP network interface 340, the enterprise server 116 may also provide information, for example in the form of web pages, to devices via the Internet 128 (see FIG. 1). The IP network interface 340 may also be utilized to place a wireless device 120, 124 in communication with a resource available on the Internet 128.

Figure 4:
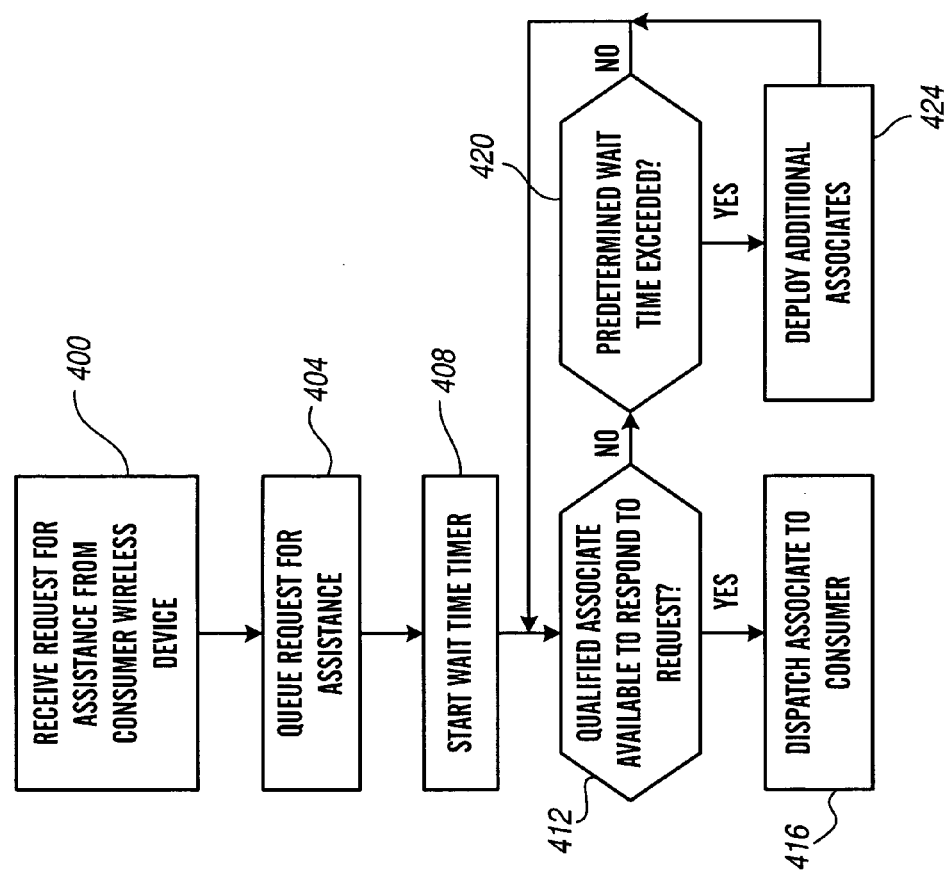
FIG. 4 is a flow chart depicting the operation of a system in accordance with the present invention in response to a consumer request for assistance.

With reference now to FIG. 4, a flow chart depicting the operation of a system in accordance with an embodiment of the present invention is illustrated. Initially, at step 400, a request for assistance is received from a consumer wireless device 120. The consumer wireless device 120 may be a device owned by the consumer and registered with the enterprise. Alternatively, the consumer wireless device 120 may be a device that is picked up by the consumer as the consumer enters the enterprise site. The request for assistance may be made through the consumer wireless device, such as by selecting a help button or by verbally requesting help. The request is then transmitted over the wireless link to the enterprise network 104.

At step 404, the request for assistance received from the consumer wireless device 120 is placed in a queue. The queue may be established in or by, for example, the resource distribution application 344. The queue may be a general one established for all requests for assistance. Alternatively, the request for assistance may be categorized according to further information received regarding the request. For example, a consumer may initiate a request for a particular type of assistance by making selections using the consumer wireless device 120. As a further example, the consumer may request that an operator in voice communication with the consumer through the consumer wireless device 120 have a particular type of assistance delivered to the consumer. As yet another example, the request for assistance may be categorized according to the location of the consumer wireless device 120 within the enterprise site. The particular location of the consumer wireless device 120 may be determined by the location monitor 316. The particular queue in which the request for assistance (or a token representing the request for assistance) is placed may accordingly be based on the consumer's location within the site. For example, a consumer in an area of the site devoted to a particular type of item may be placed in a queue for assistance with that type of item.

After the request for assistance has been placed in a queue, a wait time timer, for example implemented as part of the wait time monitor 320 is started (step 408). At step 412, a determination is made as to whether a qualified associate is available to respond to the request. As noted above, an associate may be qualified to respond to a request based on various factors, such as the associate's experience, areas of expertise, and the proximity of the associate to the consumer. If a qualified associate is available, that associate is dispatched to the consumer (step 416).

If no qualified associate is available to respond to the request, a determination is made as to whether a predetermined wait time (or threshold) has been exceeded (step 420). In general, the predetermined wait time is established as a trigger to assist the enterprise in maintaining service level objectives (e.g., a maximum wait time experienced by a consumer while checking out of the enterprise). If the predetermined wait time has not been exceeded, the system returns to step 412 to check for the availability of a qualified associate. If the predetermined wait time has been exceeded, additional associates are deployed (step 424). Alternatively, a manager may be notified of the condition, and the manager may then determine how best to respond to the condition. Furthermore, it should be appreciated that multiple predetermined wait times may be established, each having associated therewith a different level of urgency. For example, as successive predetermined wait times are exceeded, the deployment of associates may become more aggressive. The different predetermined wait times may be based on times that correlate to likely consumer annoyance, potential consumer dissatisfaction, and potential loss of the sale or transaction.

As can be appreciated, additional associates or agents deployed to a task should be qualified to perform that task. In order to assist in the deployment of appropriate associates to tasks, associates may be assigned to one or more primary tasks as well as to one or more backup tasks. Accordingly, an associate qualified for a task in connection with which wait times are being exceeded may be reassigned to that task. Furthermore, an associate whose primary tasks include a task in connection with which wait times are being exceeded may be assigned to that task in preference to an associate qualified to perform that task on a backup basis. Accordingly, as can be appreciated, the deployment of associates to various tasks may be performed in connection with an automated application, such as the resource distribution application 344.

Figure 5:
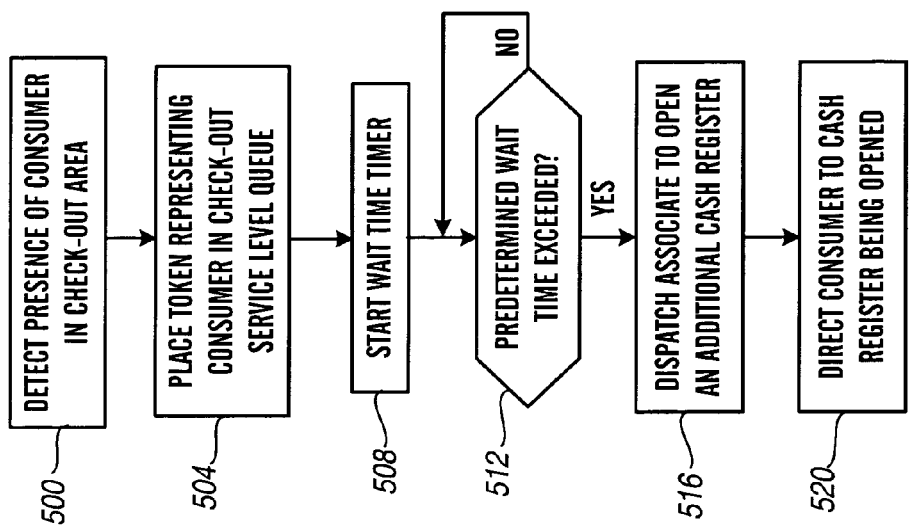
FIG. 5 is a flow chart illustrating the operation of a system in accordance with an embodiment of the present invention in connection with assigning cashiers to assist consumers in checking out of the enterprise site.

With reference now to FIG. 5, the maintenance of service level objectives in connection with a checkout area in a retail location in accordance with an embodiment of the present invention is illustrated. Initially, at step 500, the presence of a consumer in the checkout area of the enterprise site is detected. The presence of the consumer in the checkout area may be determined by determining that the consumer wireless device 120 associated with a consumer has entered the checkout area. Such a determination may be made by the location monitor application 316. At step 504, a token representing the consumer detected in step 500 is placed in a checkout service level queue (step 504). Next, a wait time timer is started (step 508).

At step 512, a determination is made as to whether the predetermined wait time has been exceeded. If no, then the system may continually check the wait time. If the predetermined wait time has been exceeded, an associate is dispatched to open an additional cash register (step 516). As can be appreciated, the service level queue may be established in connection with, for example, a resource distribution application 344. Furthermore, the resource distribution application 344 may select an appropriate associate for dispatch to the checkout area. For example, an associate qualified to open a cash register that is not required in connection with any other task, or that can be redeployed to a cashier function with less disruption to operations at the enterprise site than another associate, is selected. The various criteria considered by the resource distribution application 344 can be tailored to the requirements of the enterprise site. Furthermore, any special requirements of a consumer can be considered by the resource distribution application 344. For example, an associate that is also a supervisor will be dispatched by the resource distribution application to a cash register at which a transaction requiring supervisory approval is or will be taking place.

The associate dispatched to open an additional cash register or to assist at a cash register that is already open may be notified of the new assignment by a message sent to an associate wireless device 124 associated with the redeployed associate. Furthermore, the instruction may be delivered as a text or graphic message displayed to the associate, and/or as an audible message output to the associate. Alternatively, the associate may be dispatched by a manager operating a public address system or a message board.

According to the present invention, the consumer waiting in the checkout area may be directed to the cash register being opened (step 520). In particular, the consumer with respect to which the predetermined wait time has expired, the consumer within a group of consumers that has been waiting the longest to check out, the consumer with respect to which the highest service level objective has been assigned, or the consumer selected after a balancing of such criteria, may be directed to the cash register being opened. The consumer may receive notification of the cash register being opened through the consumer wireless device 120 associated with the consumer. Alternatively, notification may be provided through an audible or visual signal, such as an announcement delivered over a public address system or a message on a message display.

According to a further embodiment of the present invention, consumers may be selected for immediate assistance at a newly opened cash register according to criteria other than or in addition to the wait time that the consumer has already experienced. For example, different levels of service may be provided to different consumers. Examples of situations in which an enterprise might provide a different level of service includes the provision of higher levels of service to consumers willing to share demographic information with the enterprise, consumers who have a long standing relationship with the enterprise, or consumers who experienced wait times in excess of predetermined wait times while waiting for assistance. Accordingly, the present invention may provide an incentive for consumers to share personal information with the enterprise, as consumers who do so can be privately notified of registers being opened in return for such information, and thus can be provided with higher service levels.

According to another embodiment of the present invention, an associate may be directed to assist a consumer based on a balancing of a number of criteria. For example, where an associate is required to retrieve an item for a consumer, the location of the associate, the location of the item, the service level objective established with respect to the consumer, and the amount of time that the consumer has been waiting for assistance may all be considered.

Although the examples given above have discussed the use of various embodiments of the present invention in connection with retail locations, the invention is not so limited. For instance, the invention may be utilized in connection with any customer service operation in connection with which consumers are served by live, in person associates. For example, the present invention may be applied to baggage check-in lines at an airport. In addition, the present invention is not limited to using wait times to determine the urgency with which associates or other resources are dispatched to respond to needs for service. For example, in a hospital setting, resources may be dispatched first to consumers (i.e., patients in the present example) experiencing emergencies before such resources are dispatched with respect to consumers not requiring immediate assistance.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A method of maintaining on-site service level objectives, comprising:
    detecting at an enterprise site a consumer wireless device;
    detecting a need for assistance associated with said consumer wireless device, wherein said need for assistance comprises a need for at least one of live assistance, physical assistance and in-person assistance;
    monitoring an amount of time elapsed since said need for assistance was detected;
    monitoring with respect to each cash register associated with said enterprise site a number of consumers waiting to check out; and
    in response to detecting an amount of elapsed time since said need for assistance was detected in excess of at least a first predetermined amount, assigning a resource to address said need for assistance detected in connection with said consumer wireless device, wherein assigning a resource comprises reassigning a resource engaged in a first task to a second task that addresses said detected need for assistance, wherein said need for assistance further comprises a need to check out with a cashier, and wherein said second task comprises opening and operating a cash register.

2. The method of claim 1, further comprising:
    monitoring a number of consumers waiting for assistance.

3. The method of claim 1, further comprising:
    determining an expected wait time for each of a number of resources associated with said enterprise site, wherein a resource having a shortest wait time is identified.

4. The method of claim 3, further comprising:
    using a message delivered to said consumer wireless device to direct a consumer to said cashier resource having a shortest wait time.

5. The method of claim 3, further comprising:
    maintaining a queue comprising consumers waiting for said resource.

6. The method of claim 1, wherein said need for assistance further comprises a need for a supervisor.

7. The method of claim 1, wherein assigning a resource further comprises directing an associate to a consumer associated with said consumer wireless device.

8. The method of claim 7, wherein instructions directing said associate to said consumer are delivered to said associate by an associate wireless device.

9. The method of claim 7, further comprising establishing a queue of consumers awaiting a resource, wherein an associate is directed to a consumer that has been in said queue longer than any other consumer.

10. The method of claim 1, further comprising:
   detecting movement of said consumer; and
   initiating communications with said consumer through said consumer wireless device.

11. The method of claim 1, wherein said at least a first predetermined amount of time comprises a service level objective.

12. The method of claim 1, wherein said method is performed by execution of instructions stored in a computer readable medium.

13. The method of claim 1, wherein said method is performed by a logic circuit.

14. The method of claim 1, wherein assigning a resource includes directing an associate to assist with items in a queue with which said need for assistance associated with said consumer wireless device have been placed.

15. A system for maintaining on-site service level objectives, comprising:
   an enterprise site;
   a wireless network deployed at said enterprise site;
   a server interconnected to said wireless network;
   a plurality of site resources, wherein at least some of said site resources are capable of performing a number of different tasks;
   an associate wireless device; and
   software operative on said server for generating one or more signals for allocating said site resources, wherein an assignment of at least one of said site resources to a first task within said site is made in consideration of an expected consumer wait time for a resource to perform said first task, wherein said assignment of at least one of said site resources to a first task within said site is also made in consideration of an amount of time elapsed since a need for service by a consumer comprising at least performance of the first task by a site resource was detected, wherein said need for service is provided to said software operative on said server by a consumer wireless device via the wireless network, wherein said site resources comprise associates, and wherein an assignment of an associate to a task is communicated to said associated by said associate wireless device.

16. The system of claim 15, wherein said site resources comprise associates, said system further comprising:
   an associate wireless device, wherein an assignment of an associate to a task is communicated to said associate by said associate wireless device.

17. The system of claim 15, further comprising:
   a consumer wireless device, wherein said consumer wireless device is in communication with said wireless network, and wherein a location of said consumer wireless device within said enterprise site can be determined.

18. The system of claim 17, wherein said consumer wireless device comprises an output device, wherein information directing a consumer to a resource is communicated to said consumer.

19. A system for maintaining service level objectives at an enterprise site, comprising:
   means for wirelessly communicating;
   means for monitoring a service level provided to consumers at said enterprise site, wherein said means for monitoring receives information indicative of a service level from said means for wirelessly communicating, and wherein said enterprise site is a retail store;
   means for determining a location of said consumers at said enterprise site; and
   means for allocating resources to said consumers, wherein an allocation of a resource to a first consumer having a greatest wait time is made in response to a request for service by said first consumer based on a location of said first consumer and an amount of time that said first consumer has waited for a resource, wherein a resource comprising an associate is allocated to serve said first consumer after a predetermined amount of time has elapsed since said request for service by said first consumer, wherein allocating said associate to serve said first consumer includes reassigning said associate from a primary task to a backup task comprising assisting said first consumer, and wherein allocating said associate further includes dispatching said associate to said determined location of said consumer.

20. The system of claim 19, wherein an allocation of resources is communicated to a resource by said means for wirelessly communicating.

21. The system of claim 19, further comprising:
   means for determining the location of a consumer within said enterprise site.

22. The system of claim 21, wherein a token associated with a consumer located within an area of said enterprise site is placed in a queue.

23. The system of claim 19, further comprising:
   means for determining the location of a resource within said enterprise site.

* * * * *